(12) United States Patent
Rajaram et al.

(10) Patent No.: US 8,336,312 B2
(45) Date of Patent: Dec. 25, 2012

(54) ATTENUATION OF COMBUSTION DYNAMICS USING A HERSCHEL-QUINCKE FILTER

(75) Inventors: Rajesh Rajaram, Oviedo, FL (US); David M. Ritland, Winter Park, FL (US)

(73) Assignee: Siemens Energy, Inc., Orlando, FL (US)

( * ) Notice: Subject to any disclaimer, the term of this patent is extended or adjusted under 35 U.S.C. 154(b) by 824 days.

(21) Appl. No.: 12/486,213

(22) Filed: Jun. 17, 2009

(65) Prior Publication Data
US 2010/0319349 A1 Dec. 23, 2010

(51) Int. Cl.
*F02C 3/14* (2006.01)
*F02C 7/24* (2006.01)
*F23R 3/46* (2006.01)

(52) U.S. Cl. ............................. 60/725; 60/748; 60/39.37
(58) Field of Classification Search .................... 60/725, 60/748, 752, 39.37
See application file for complete search history.

(56) References Cited

U.S. PATENT DOCUMENTS

| | | | |
|---|---|---|---|
| 5,373,695 A * | 12/1994 | Aigner et al. | 60/725 |
| 5,685,157 A | 11/1997 | Pandalai et al. | |
| 5,687,572 A | 11/1997 | Schrantz et al. | |
| 5,836,164 A * | 11/1998 | Tsukahara et al. | 60/748 |
| 6,112,514 A | 9/2000 | Burdisso et al. | |
| 6,530,221 B1 * | 3/2003 | Sattinger et al. | 60/725 |
| 6,732,528 B2 * | 5/2004 | Akagi et al. | 60/752 |
| 6,923,001 B2 * | 8/2005 | Laster et al. | 60/750 |
| 7,017,707 B2 | 3/2006 | Zia et al. | |
| 7,272,931 B2 | 9/2007 | Held et al. | |
| 2004/0159107 A1 * | 8/2004 | Sullivan et al. | 60/752 |
| 2005/0016178 A1 | 1/2005 | Wasif et al. | |
| 2005/0144950 A1 | 7/2005 | Flohr et al. | |
| 2007/0199326 A1 * | 8/2007 | Tanimura et al. | 60/752 |
| 2008/0041058 A1 | 2/2008 | Johnson et al. | |
| 2008/0190111 A1 | 8/2008 | Tiribuzi | |

OTHER PUBLICATIONS

Ayman El-Badawy and Wael El-Arna'Outy; Passive Noise Control of a Burner-Combustor System of a Turbo-Fan Engine; ICSV14; Jul. 9-12, 2007; Cairns, Australia.

* cited by examiner

*Primary Examiner* — Ted Kim (57) ABSTRACT

A can-annular gas turbine engine including a casing defining an annulus for receiving air flow from a compressor. A combustor basket is supported within the casing, and a swirler assembly is located within the basket and includes an air inlet and an outlet located in a combustion chamber. The swirler assembly is configured to discharge a fuel/air mixture from the outlet downstream into the combustion chamber. An acoustic filter is provided comprising a Herschel-Quincke tube having a first open end at the annulus and a second open end adjacent to the swirler assembly within the combustion chamber. Components of acoustic pressure oscillations travel along two paths of different lengths from one end of the Herschel-Quincke tube to the opposite end of the tube where out of phase components of the pressure oscillations interact to attenuate the pressure oscillations.

19 Claims, 5 Drawing Sheets

ATTENUATION OF COMBUSTION DYNAMICS USING A HERSCHEL-QUINCKE FILTER

FIELD OF THE INVENTION

The present invention relates to acoustic damping for a gas turbine combustor and, more particularly to an acoustic damping construction to attenuate dynamic pressure pulses using Herschel-Quincke tubes.

BACKGROUND OF THE INVENTION

Combustion turbines generally comprise a casing for housing a compressor section, a combustor section and a turbine section. Each one of these sections comprise an inlet end and an outlet end. A combustor transition duct is mechanically coupled between the combustor section outlet end and the turbine section inlet end to direct a working gas from the combustor section into the turbine section.

The working gas is produced by combusting an air/fuel mixture in one or more combustors located in the combustor section. A supply of compressed air, originating from the compressor section, is mixed with a fuel supply to create a combustible fuel/air mixture. The fuel/air mixture is combusted in the combustor to produce a high temperature and high pressure working gas. The working gas flows from the combustor through the combustor transition duct into a first stage of the turbine section.

Destructive acoustic pressure oscillations or pressure pulses may be generated in the combustor as a consequence of normal operating conditions depending on fuel/air stoichiometry, total mass flow, and other operating conditions. In accordance with current design practices to lower NOx emissions required to meet federal and local air pollution standards, leaner premixed combustion systems are typically used in which fuel and air are mixed homogeneously upstream of the flame reaction region, and in which the fuel/air ratio or the equivalence ratio at which these combustion systems are operated is much leaner compared to more conventional combustors in order to maintain low flame temperatures which in turn limits production of unwanted gaseous NOx emissions to acceptable levels.

Although this method of achieving low emissions is widely used, there is a combustion instability which may occur during operation at low equivalence ratio, tending to create unacceptably high dynamic pressure oscillations in the combustor. Dynamic pressure oscillations or pressure pulses can result in mechanical and thermal fatigue to combustor hardware.

The present invention addresses the problem associated with dynamic pressure oscillations in a gas turbine engine combustor by providing an acoustic filter for attenuating the energy associated with the pressure oscillations.

SUMMARY OF THE INVENTION

In accordance with one aspect of the invention, a can-annular gas turbine engine is provided comprising a casing defining an annulus for receiving air flow from a compressor. A combustor basket is supported within the casing, and a swirler assembly is located within the basket and includes an air inlet and an outlet located in a combustion chamber. The swirler assembly is configured to discharge a fuel/air mixture from the outlet downstream into the combustion chamber. An acoustic filter is provided comprising a Herschel-Quincke tube having opposing first and second open ends. The first end is located at the annulus and the second end is located in fluid communication with and upstream of the combustion chamber.

Air flow in the annulus may flow to a flow turn around region upstream of the air inlet for the swirler assembly. A first acoustic path $P_1$ may be defined extending along a centerline of the tube from a first location in the annulus adjacent to the first end of the tube to a second location upstream of the combustion chamber adjacent to the second end of the tube, and a second acoustic path $P_2$ may be defined extending within the annulus from the first location to the flow turn around region and extending within the combustor basket from the flow turn around region to the second location. Acoustic energy at either one of the first and second locations may divide into two components at the one of the first and second locations and propagate along each of the first and second paths $P_1$ and $P_2$ to the other of the first and second locations where the two components may interact to cancel each other and attenuate the acoustic energy at one or more frequencies.

The first and second flow paths may be configured such that the first path $P_1$ has a length that may be different than the length of the second path $P_2$.

The swirler assembly may be mounted to a base plate extending within the combustor basket, and the second end of the tube may be located adjacent to a downstream side of the base plate and upstream from a flame front region in the combustion chamber.

A plurality of swirler assemblies may be mounted to a base plate extending within the combustor basket and having outlets in the combustion chamber; and an array of Herschel-Quincke tubes, each having a first end located at the annulus and a second end located at the combustion chamber. The second ends of the tubes are located adjacent to a downstream side of the base plate and between the swirler assemblies.

The array of Herschel-Quincke tubes may comprise two or more tube lengths to attenuate different acoustic frequencies.

A major length of the tube may be defined as comprising a portion of the tube extending from the second end to a junction between the tube and an inner surface of the combustor basket. The tube may comprise a bend formed in the major length thereof.

In accordance with another aspect of the invention, a can-annular gas turbine engine may be provided comprising a casing defining an annulus for receiving air flow from a compressor, and a combustor basket supported within the casing. A base plate is mounted within the combustor basket. Main swirler assemblies are mounted on the base plate, each having an air inlet located on an upstream side of the base plate and an outlet located adjacent to a combustion chamber on a downstream side of the base plate. An acoustic filter is provided comprising an array of Herschel-Quincke tubes, each having opposing first and second open ends, wherein the first ends are located at the annulus and the second ends are located in fluid communication with and upstream of the combustion chamber adjacent to the downstream side of the base plate.

In accordance with a further aspect of the invention, a combustor for a gas turbine engine is provided. The combustor comprises a combustor basket, and a fuel/air assembly located within the combustor basket and having an air inlet and an outlet located adjacent to a combustion chamber. The fuel/air assembly is configured to discharge a fuel/air mixture from the outlet downstream into the combustion chamber. The combustor is located within a casing to define an airflow passage between the combustor basket and the casing. A flow turn around region is defined adjacent to an upstream end of the combustor basket where a flow of air from a compressor changes direction from an upstream flow to a downstream flow. A first acoustic path $P_1$ is defined through at least one Herschel-Quincke tube from a first location adjacent to a first end of the tube at the airflow passage to a second location adjacent to a second end of the tube in fluid communication with and upstream of the combustion chamber. A second acoustic path $P_2$ is defined extending along the airflow passage from the first location to the flow turn around region and from the flow turn around region to the second location. The acoustic energy at either one of the first and second locations divides into two components at the one of the first and second locations and propagates along each of the first and second paths $P_1$ and $P_2$ to the other of the first and second locations where the two components interact to cancel each other and attenuate the acoustic energy at one or more frequencies.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
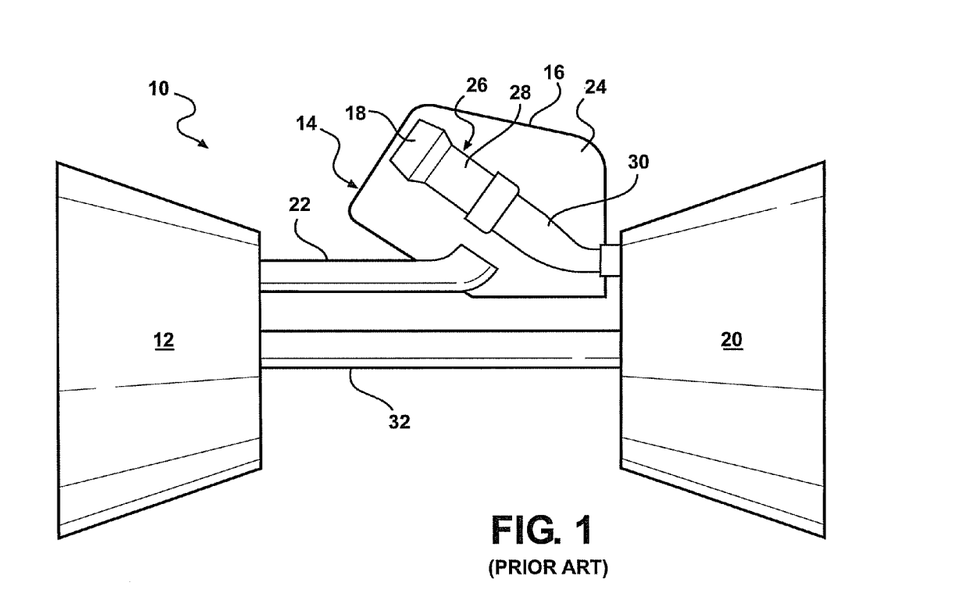
FIG. 1 is a schematic cross-sectional view depicting a prior art gas turbine engine in which the present invention may be incorporated.

Referring to FIG. 1, an initial discussion is provided of a common arrangement of elements of a prior art gas turbine engine 10, depicted schematically, into which an embodiment of the present invention may be incorporated. The gas turbine engine 10 comprises a compressor 12, a combustor section 14 including a casing 16 and a plurality of combustors 26 (only one shown) each comprising a combustor basket 18 supported within the casing 16 and may be arranged in a can-annular configuration, and a turbine 20. During operation, in axial flow series, the compressor 12 takes in air and provides compressed air to a diffuser 22, which passes the compressed air to a plenum 24 formed within the casing 16. The compressed air passes through the plenum 24 to the combustor basket 18, where the compressed air is mixed with fuel (not shown). The fuel/air mixture is combusted in a combustion chamber 28, and thereafter hot combusted gases are passed via a transition 30 to the turbine 20. A shaft 32 is shown connecting the turbine to drive the compressor 12. Although depicted schematically as a single longitudinal channel, the diffuser 22 extends annularly about the shaft 32 in typical gas turbine engines, as does the plenum 24.

Figure 2:
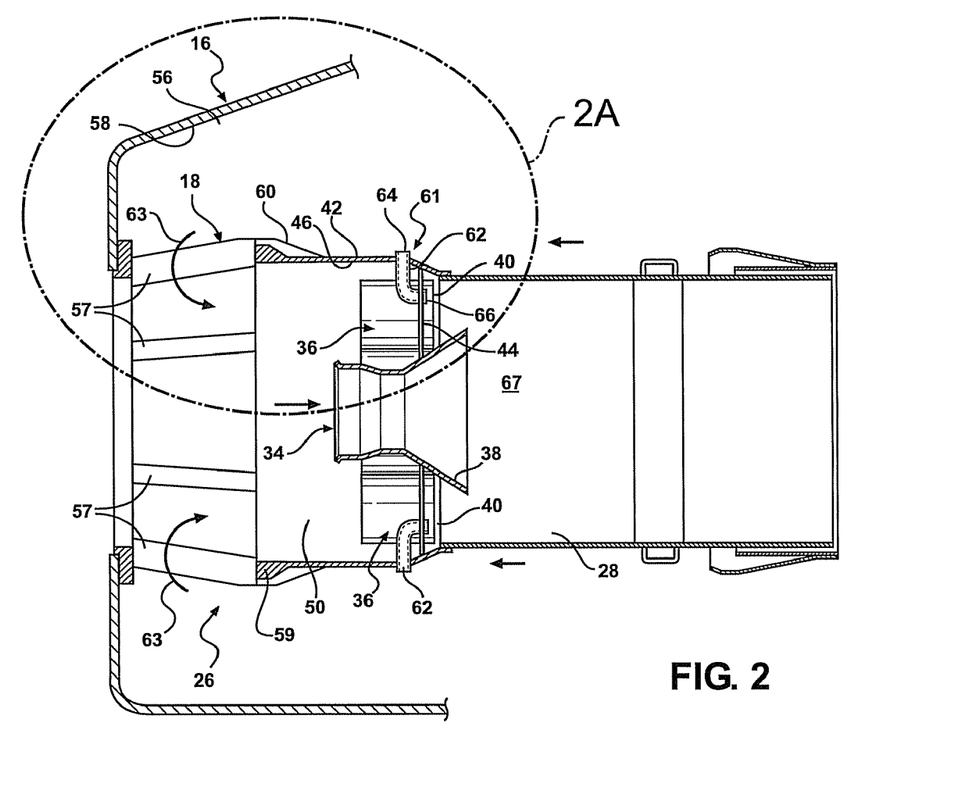
FIG. 2 is a cross-sectional cut-away view of a combustor and combustion chamber positioned in a casing of a combustor section.

Referring to FIG. 2, the combustor 26 comprises a plurality of fuel/air assemblies for facilitating mixing of fuel and air entering the combustion chamber 28, such as by creating a swirling flow of the fuel and air. In particular, the combustor 26 comprises fuel/air assemblies including a pilot swirler assembly 34 located at a center of the combustor 26 for performing diffusion combustion, and a plurality of main swirler assemblies 36 located circumferentially and equally spaced around the outside circumference of the pilot swirler assembly 34 for performing premixed combustion. A pilot cone 38 is provided at an exit of the pilot swirler assembly 34 so as to surround and cover the tip of a pilot nozzle (not shown) extending to the pilot swirler assembly 34. The main swirler assemblies 36 comprise swirler cups 40 surrounding and covering the tips of main nozzles (not shown) extending to the main swirler assemblies 36. Each of the main pilot assembly 34 and main swirl assemblies 36 preferably include swirler vanes (not shown) for producing a tangentially swirling flow of fuel and air through the assemblies 34, 36.

Figure 3:
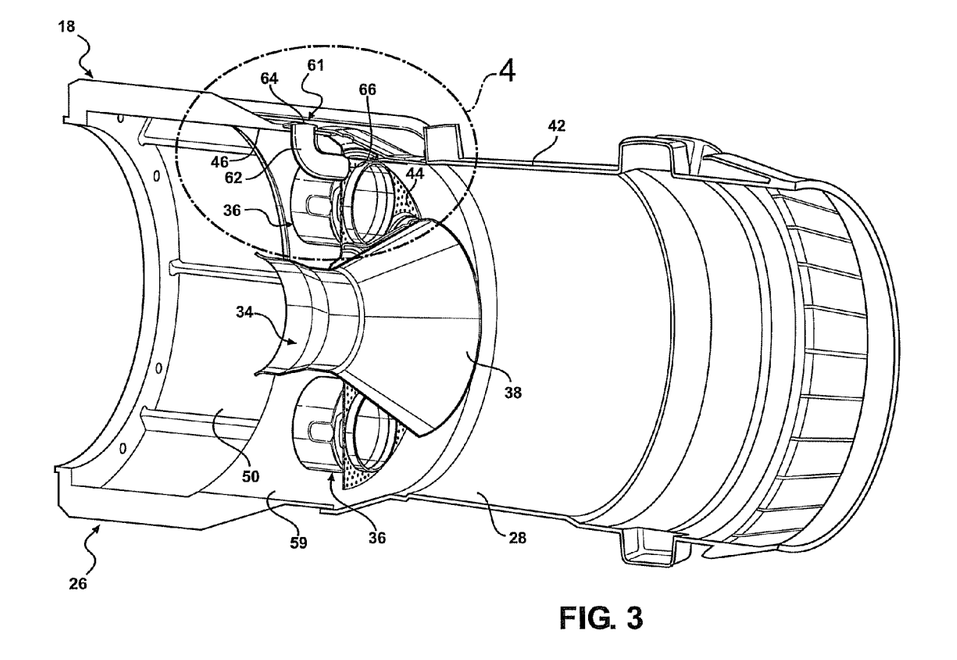
FIG. 3 is a perspective cut-away view of a combustor basket incorporating the Herschel-Quincke system.
Figure 4:
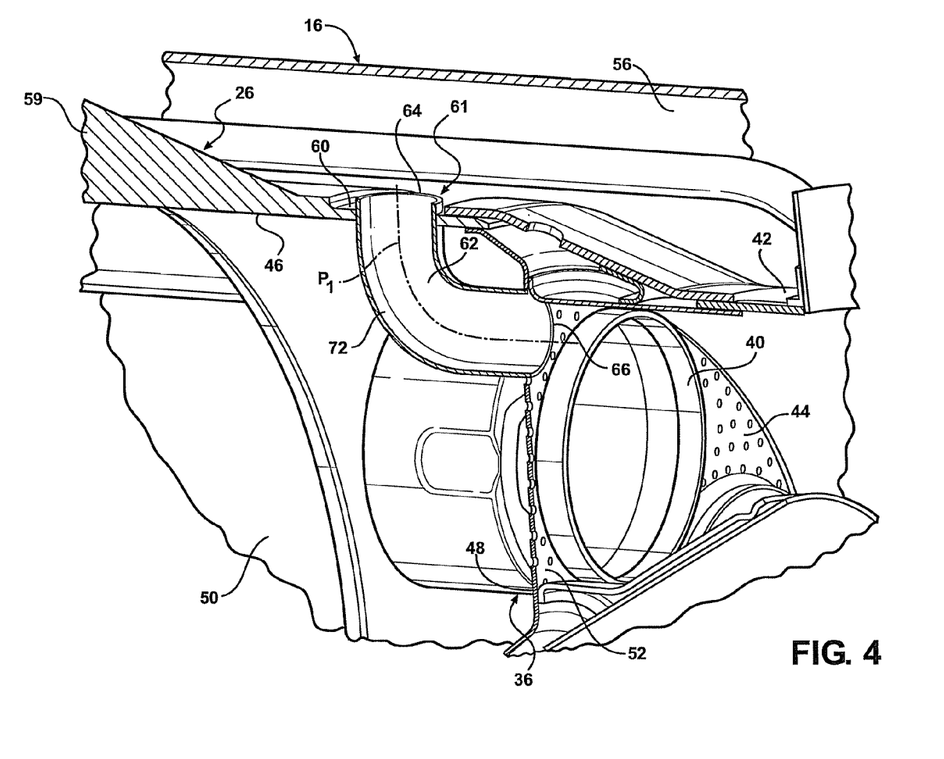
FIG. 4 is an enlarged view of the area of a main swirler assembly identified in FIG. 3.

Referring to FIGS. 3 and 4, the combustor basket 18 comprises a generally cylindrical combustor outer liner 42 supported to the casing 16 by a head end 59 of the combustor basket 18. The head end 59 and outer liner 42 surround the pilot and main swirler assemblies 34, 36, and a base plate 44 extends radially within the combustor basket 18 and is supported to an inner surface 46 of the combustor basket 18. The base plate 44 comprises an upstream side 48 facing upstream toward an air inlet chamber 50, and a downstream side 52 facing downstream toward the combustion chamber 28 (FIG. 4). The pilot and main swirler assemblies 34, 36 are mounted on the base plate 44, extending though the base plate 44, such that an upstream inlet portion of each of the swirler assemblies 34, 36 extends in the air inlet chamber 50 and a downstream outlet portion of each of the swirler assemblies 34, 36 is located adjacent to the combustion chamber 28.

As seen in FIG. 2, an annulus 56 is defined within the casing 16 between an inner side 58 of the casing 16 and an outer surface 60 of the combustor basket 18. The annulus 56 defines an airflow passage wherein compressed air supplied from the compressor 12 flows into the plenum 24 and upstream through the annulus 56 toward the head end 59 of the combustion basket 18. The air flow changes direction in a flow turn around region, indicated generally by the arrows 63, as the air flows inwardly through legs 57 of the combustor basket 18 into the air inlet chamber 50 within the combustor basket 18. The air within the air inlet chamber 50 passes through the swirler assemblies 34, 36 where it mixes with fuel, and the fuel/air mixture passes from the swirler assemblies 34, 36 into the combustion chamber 28 where it is ignited.

Combustion of the fuel/air mixture may produce destructive acoustic pressure oscillations. In order to diminish or attenuate the acoustic pressure oscillations, a Herschel-Quincke (HQ) acoustic filter 61 is provided in the combustor 26, associated with the combustion chamber 28. In accordance with an embodiment of the present invention, the HQ acoustic filter comprises at least one HQ tube 62, see FIGS. 2, 2A, and 3-4, and preferably comprises an array formed of a plurality of HQ tubes 62 (only one shown in FIG. 3) located in circumferentially spaced relation to each other around the circumference of the combustor basket 18. The HQ tubes 62 are of sufficient diameter and comprise selected lengths to transmit acoustic pulses at frequencies in a range to be attenuated in the combustion chamber 28, such as within a range of about 1000 Hz to about 5000 Hz. Each of the HQ tubes 62 is preferably positioned between an adjacent pair of main swirler assemblies 36 and comprises a first open end 64 located at or adjacent to the outer surface 60 of the combustor basket 18, and opening into the annulus 56, and a second open end 66 located in fluid communication with and upstream of combustion chamber 28.

Further, the HQ tubes 62 are located such that they are adjacent to the base plate 44 (FIG. 4) with the second end 66 positioned upstream from a flame front, as generally identified by location 67 (FIG. 2). Hence, the HQ tubes 62 are located to provide a cooling air flow that will pass directly from the annular air flow in the annulus 56 to the axial air flow in the combustion chamber 28 and then enter the combustion basket 18 upstream of the flame front 67, for facilitating a reduction in NOx production, as compared to a typical resonator box (i.e., Helmholtz resonator), while also providing an acoustic filter to attenuate the amplitude of acoustic pressure oscillations adjacent to the base plate 44.

Figure 2A:
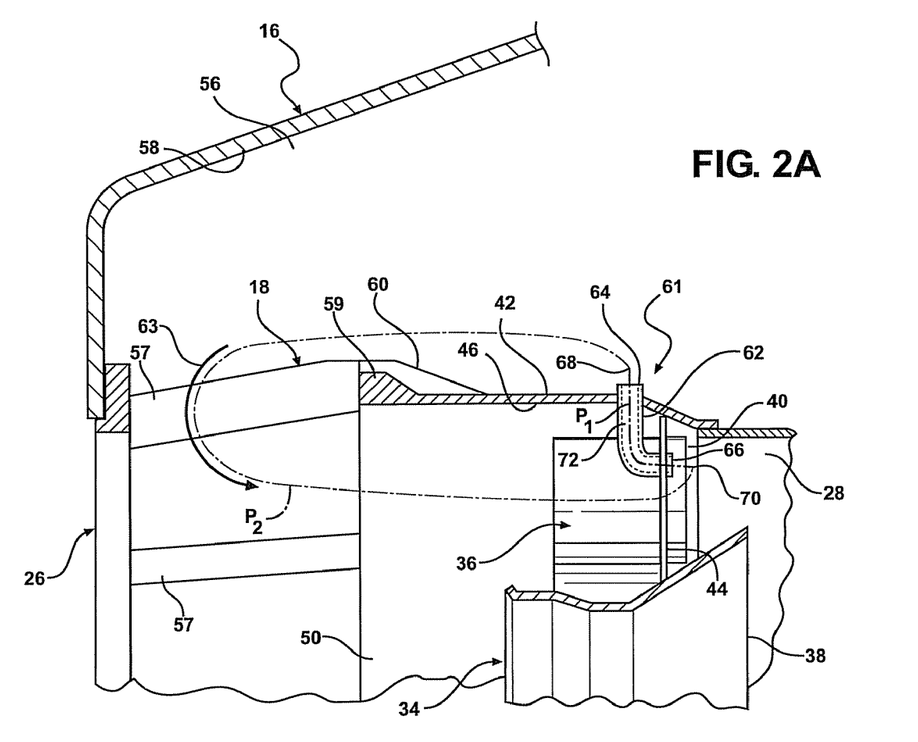
FIG. 2A is an enlarged view of the area identified in FIG. 2 and illustrating a main swirler assembly and first and second acoustic paths for a Herschel-Quincke acoustic oscillation attenuation system.

As illustrated in FIG. 2A, a first acoustic path $P_1$ is defined extending along a centerline of the HQ tube 62 from a first location 68 in the annulus 56 adjacent to the first end 64 of the HQ tube 62 to a second location 70 in the combustion chamber 28 adjacent to the second end 66 of the tube 62. A second acoustic path $P_2$ is defined extending within the annulus 56 from the first location 68 to the flow turn around region 63 and extending within the combustor basket 18 from the flow turn around region 63 to the second location 70.

Figure 5:
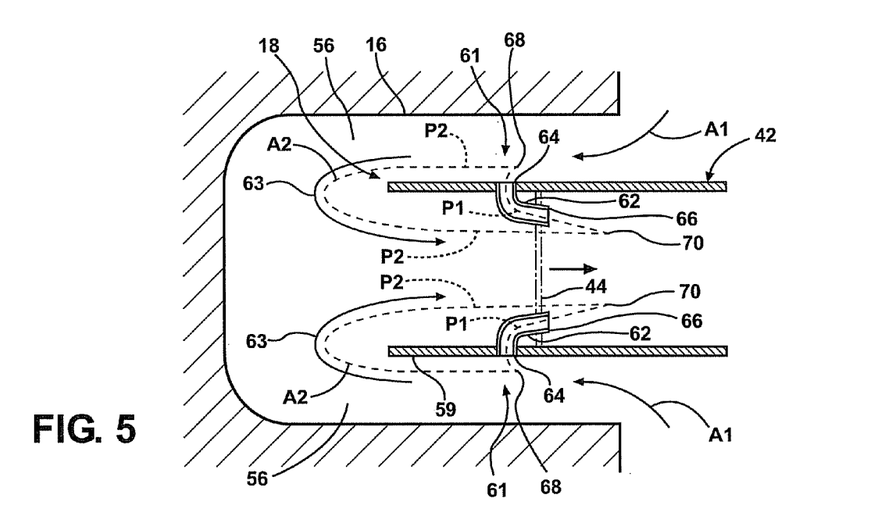
FIG. 5 is a diagrammatic view illustrating the first and second acoustic paths of the present Herschel-Quincke system in relation to the casing and combustor basket.

The acoustic paths $P_1$, $P_2$ are further illustrated diagrammatically in FIG. 5 where the combustor basket head end 59 and outer liner 42 is shown located within an area of the casing 16. The acoustic paths $P_1$, $P_2$ generally follow flow paths of air entering the annulus, as shown at $A_1$. The air flow passes through the annulus 56 to the flow turn around region 63 (flow $A_2$) and then passes downstream through the combustor basket 18 along a generally axial flow $A_3$. A portion of the flow $A_1$ through the annulus 56 is diverted through the HQ tubes 62 directly to the axial flow $A_3$. As can be seen in FIG. 5, the lengths of the acoustic paths $P_1$, $P_2$ relative to each other may be varied or adjusted by altering the lengths of the HQ tubes 62, as well as by changing the axial location of the HQ tubes 62 along the annulus 56, to thereby vary the distance of the two paths $P_1$ and $P_2$ between the first end 64 and the second end 66 of the HQ tubes 62. However, as described above, the preferred axial location of the HQ tubes 62 places the HQ tubes 62 close to the base plate 44.

Hence, the HQ tube 62 provides an acoustic path that connects the annulus air at or just upstream from the reverse flow region 63 with the area of the combustion chamber 28 just downstream from the base plate 44, i.e., adjacent to the downstream side 52 of the base plate 44. The length of the second acoustic path $P_2$ is different from the length of the first acoustic path $P_1$ and, as is illustrated in the present embodiment, the second acoustic path $P_2$ is longer than the first acoustic path $P_1$. In accordance with the illustrated embodiment, the first end 64 of the HQ tube 62 is located adjacent to the outer surface 60 of the combustor basket 18, wherein a major length of each of the HQ tubes 62 comprises a major portion 72 of the tube 62 extending from the second end 66 to a junction between the HQ tube 62 and the inner surface 46 of the combustor basket. In order to accommodate a desired length of the major portion 72 of the tube 62 between the main swirler assemblies 36, the major portion 72 of the HQ tube 62 may be curved or include a bend, and is configured to locate the second end 66 upstream of the area of combustion. In addition, it may be noted that the major portion 72 of the HQ tube 62 may be located adjacent to the upstream side 48 of the base plate 44 wherein an end portion at the second end 66 passes through the base plate 44 to open into the combustor basket 18 adjacent the downstream side 52 of the base plate 44.

As is generally known with regard to Herschel-Quincke filters, the different acoustic path lengths of $P_1$ and $P_2$ permits attenuation of acoustic waves (pulses) traveling along the two paths to reduce or dampen the energy associated with the acoustic waves. In the present application of the Herschel-Quincke filter 61, the originating acoustic pulses and the associated attenuated acoustic pulses are located on radially opposite sides of the combustor basket 42 In particular, acoustic energy originating at either one of the first and second locations 68, 70 divides into two components at the one of the first and second locations 68, 70 and propagates along each of the first and second paths $P_1$ and $P_2$ to the other of the first and second locations 68, 70 where the two components interact to at least partially cancel each other and attenuate the acoustic energy at one or more frequencies, including within a range of frequencies. A description of conventional Herschel-Quincke tube system theory is provided in the publication entitled *Passive Noise Control of a Burner-Combustor System in a Turbo-Fan Engine,* Ayman El-Badawy and Wael EL-ARNA'OUTY, ICSV14, 2007, which is incorporated herein by reference.

The attenuation of acoustic energy at the point that the components of the acoustic energy interact occurs as a result of the acoustic waves of the two components being out of phase with each other, and preferably 180 degrees out of phase with each other as they interact to decrease the amplitude, and thereby decrease or attenuate the energy, associated with the acoustic pressure oscillation. The length of the HQ tube 62 may be selected depending on the particular frequency or range of frequencies to be attenuated, and particularly with reference to those frequencies associated with the acoustic pressure oscillations that may cause damage to the structure of the combustor 26 if left unmitigated. For example, the length of the HQ tube 62 may be selected such that the distance traveled by an acoustic wave propagated along the path $P_1$ will result in the acoustic wave intersecting a wave of a corresponding acoustic wave oscillation propagated along the path $P_2$ out of phase by approximately one half wavelength, as is known for a typical HQ tube arrangement. Further, the array of HQ tubes 62 may comprise two or more tube lengths, where the HQ tube array provides multiple length acoustic paths which creates an acoustic filter for filtering or attenuating the amplitude of a plurality of different acoustic frequencies. Also, the diameters of the HQ tubes 62 are preferably sized to ensure acoustic pulses of sufficient energy, i.e., sufficient acoustic energy, are propagated through the tubes 62 for attenuation of the desired frequencies.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A can-annular gas turbine engine comprising:
   a casing defining an annulus for receiving air flow from a compressor;

a combustor basket supported within the casing;
a swirler assembly located within the basket and having an air inlet and an outlet located in a combustion chamber, the swirler assembly configured to discharge a fuel/air mixture from the outlet downstream into the combustion chamber;
an acoustic filter comprising a Herschel-Quincke tube having a major length and opposing first and second open ends at opposing ends of the major length, and a centerline of the tube extending centrally within the tube along the major length, wherein the centerline of the tube passes through each of the first and second open ends of the tube, and wherein the first open end is located at the annulus and the second open end is located within an area surrounded by the combustor basket and is in fluid communication with and upstream of the combustion chamber; and
wherein the swirler assembly is mounted to a base plate extending within the combustor basket, and the major length of the tube extends through an air inlet chamber upstream from the base plate, the second end of the tube passes through the base plate and the second end of the tube is located at a downstream side of the base plate and upstream from a flame front region in the combustion chamber.

2. The can-annular gas turbine engine of claim 1, wherein:
air flow in the annulus flows to a flow turn around region upstream of the air inlet for the swirler assembly, a first acoustic path $P_1$ is defined extending along the centerline of the tube from a first location in the annulus adjacent to the first end of the tube to a second location upstream of the combustion chamber and adjacent to the second end of the tube, and a second acoustic path $P_2$ is defined extending within the annulus from the first location to the flow turn around region and extending within the combustor basket from the flow turn around region to the second location; and
wherein acoustic energy at either one of the first and second locations divides into two components at the one of the first and second locations and propagates along each of the first and second paths $P_1$ and $P_2$ to the other of the first and second locations where the two components interact to cancel each other and attenuate the acoustic energy at one or more frequencies.

3. The can-annular gas turbine engine of claim 2, wherein the first path $P_1$ has length that is different than the length of the second path $P_2$.

4. The can-annular gas turbine engine of claim 1, further comprising:
a plurality of swirler assemblies mounted to a base plate extending within the combustor basket and having outlets in the combustion chamber; and
an array of Herschel-Quincke tubes, each having a first end located at the annulus and a second end located at the combustion chamber, wherein the major length of each of the tubes extends through an air inlet chamber upstream from the base plate and the second ends of the tubes are located at a downstream side of the base plate and between the swirler assemblies.

5. The can-annular gas turbine engine of claim 4, wherein the array of Herschel-Quincke tubes comprises two or more different tube lengths to attenuate different acoustic frequencies.

6. The can-annular gas turbine engine of claim 1, wherein the major length of the tube comprises a portion of the tube extending from the second end to a junction between the tube and an inner surface of the combustor basket.

7. The can-annular gas turbine engine of claim 6, wherein the tube comprises a bend formed in the major length thereof.

8. A can-annular gas turbine engine comprising:
a casing defining an annulus for receiving air flow from a compressor;
a combustor basket supported within the casing;
a base plate mounted within the combustor basket;
main swirler assemblies mounted on the base plate and having an air inlet located on an upstream side of the base plate and an outlet located in a combustion chamber on a downstream side of the base plate;
an acoustic filter comprising an array of Herschel-Quincke tubes, each tube having a major length and opposing first and second open ends at opposing ends of the major length, and a tube centerline extending centrally within the tube along the major axis, wherein the tube centerline passes through each of the first and second open ends of a respective tube, and wherein the first open ends are located at the annulus and the second open ends are located within an area surrounded by the combustor basket and are in fliud communication with and upstream of the combustion chamber at the downstream side of the base plate; and
wherein the swirler assemblies are mounted to a base plate extending within the combustor basket, and the major length of the tubes extends through an air inlet chamber upstream from the base plate, the second ends of the tubes pass through the base plate and the second ends of the tubes are located at a downstream side of the base plate and upstream from a flame front region in the combustion chamber.

9. The can-annular gas turbine engine of claim 8, wherein:
air flow in the annulus flows to a flow turn around region upstream of the air inlet for the swirler assembly, and for each of the tubes:
a first acoustic path $P_1$ is defined extending along the centerline of the tube from a first location in the annulus adjacent to the first end of the tube to a second location in the combustion chamber adjacent to the second end of the tube, and a second acoustic path $P_2$ is defined extending within the annulus from the first location to the flow turn around region and extending within the combustor basket from the flow turn around region to the second location; and
wherein acoustic energy at either one of the first and second locations divides into two components at the one of the first and second locations and propagates along each of the first and second paths $P_1$ and $P_2$ to the other of the first and second locations where the two components interact to attenuate the acoustic energy at one or more frequencies.

10. The can-annular combustor of claim 9, wherein the second ends of the tubes are located between adjacent ones of the swirler assemblies.

11. The can-annular combustor of claim 10, wherein the array of Herschel-Quincke tubes comprises two or more different tube lengths to attenuate different acoustic frequencies.

12. The can-annular gas turbine engine of claim 8, wherein the tubes are each defined by a diameter extending along the lengths of the tubes and the centerline of each tube passes centrally through the diameter of the tube.

13. The can-annular gas turbine engine of claim 12, wherein the diameter of each tube defines the first and second open ends of the tube.

14. A combustor for a gas turbine engine, the combustor comprising:
a combustor basket;

a fuel/air assembly located within the combustor basket and having an air inlet and an outlet located in a combustion chamber, the fuel/air assembly configured to discharge a fuel/air mixture from the outlet downstream into the combustion chamber;

the combustor being located within a casing to define an airflow passage between the combustor basket and the casing;

a flow turn around region defined adjacent to an upstream end of the combustor basket where a flow of air from a compressor changes direction from an upstream flow to a downstream flow;

a first acoustic path $P_1$ defined through at least one Herschel-Quincke tube, the Herschel-Quincke tube having a major length and opposing first and second open ends at opposing ends of the major length, and a tube centerline extending centrally within the tube along the major axis, wherein the tube centerline passes through each of the first and second open ends of the tube, the first acoustic path $P_1$ extending from a first location adjacent to a first open end of the tube at the airflow passage to a second location adjacent to the second end of the tube located within an area surrounded by the combustor basket in fluid communication with and upstream of the combustion chamber;

a second acoustic path $P_2$ defined extending along the airflow passage from the first location to the flow turn around region and from the flow turn around region to the second location; and wherein the acoustic energy at either one of the first and second locations divides into two components at the one of the first and second locations and propagates along each of the first and second paths $P_1$ and $P_2$ to the other of the first and second locations where the two components interact to cancel each other and attenuate the acoustic energy at one or more frequencies; and wherein the fuel/air assembly is mounted to a base plate extending within the combustor basket, and the major length of the tube extends through an air inlet chamber upstream from the base plate, the second end of the tube passes through the base plate and the second end of the tube is located at a downstream side of the base plate and upstream from a flame front region in the combustion chamber.

15. The combustor of claim 14, wherein the fuel/air assembly comprises a swirler assembly.

16. The combustor of claim 14, further comprising:
a plurality of fuel/air assemblies mounted to the base plate extending within the combustor basket and having outlets in the combustion chamber; and
an array of Herschel-Quincke tubes, each having a first end located at the airflow passage between the combustor basket and the casing and a second end located at the combustion chamber, wherein the major length of each of the tubes extends through an air inlet chamber upstream from the base plate, the second ends of the tubes pass through the base plate and the second ends of the tubes are located adjacent to a downstream side of the base plate and between the air/fuel assemblies.

17. The combustor of claim 16, wherein the array of Herschel-Quincke tubes comprises two or more different tube lengths to attenuate different acoustic frequencies.

18. The combustor of claim 16, wherein the major length of each of the tubes comprises a portion of the tube extending from the second end to a junction between the tube and an inner surface of the combustor basket.

19. The can-annular gas turbine engine of claim 18, wherein one or more of the tubes comprise a bend formed in the major length thereof.

* * * * *